United States Patent
Broding

[15] 3,701,968
[45] Oct. 31, 1972

[54] AIR CUSHION SEISMIC VIBRATOR
[72] Inventor: Robert A. Broding, Tulsa, Okla.
[73] Assignee: Seismograph Service Corporation, Tulsa, Okla.
[22] Filed: March 9, 1970
[21] Appl. No.: 17,440

[52] U.S. Cl. ............................. 340/17, 181/.5 VM
[51] Int. Cl. ................................................. G01v 1/22
[58] Field of Search ........ 340/17; 181/.5 H, .5 AG, .5 VM; 180/116; 137/31, 82

[56] References Cited

UNITED STATES PATENTS

| | | |
|---|---|---|
| 3,547,218 | 12/1970 | Hamilton.................181/.5 VM |
| 3,369,519 | 2/1968 | Bricout......................181/.5 H |
| 3,106,260 | 10/1963 | Bollum, Sr.................180/116 |
| 3,432,804 | 3/1969 | Beeken..........................340/15 |
| 3,216,449 | 11/1965 | Maudlin et al....137/625.31 X |

FOREIGN PATENTS OR APPLICATIONS 1,140,563  1/1969  Great Britain.............180/116

OTHER PUBLICATIONS

" Soft Touch," pg. A-76, Geophysics, June 1970, Seismograph Service Corp.

Primary Examiner—Benjamin A. Borchelt
Assistant Examiner—H. A. Birmiel
Attorney—Mason, Kolehmainen, Rathburn & Wyss

[57] ABSTRACT

A seismic vibrator is designed for use over all kinds of terrain including marshy areas where conventional land or sea vibrators cannot be used. The vibrator is an air cushion vehicle modified by the addition of an air flow modulator which pressure modulates the air cushion. The pressure modulations are passed on to the material beneath the vehicle.

14 Claims, 10 Drawing Figures

INVENTOR
ROBERT A. BRODING
BY Mason, Kolehmainen,
Rathburn, & Wyss
ATTORNEYS

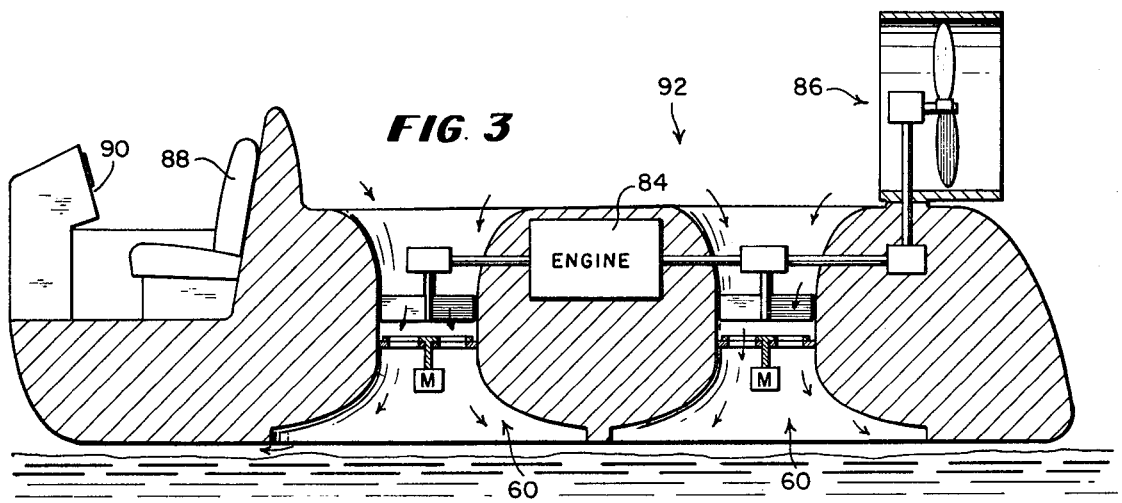
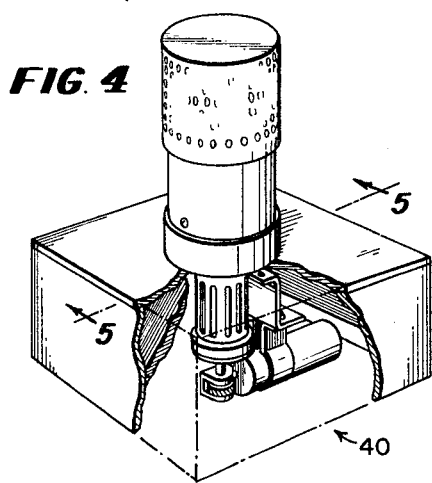
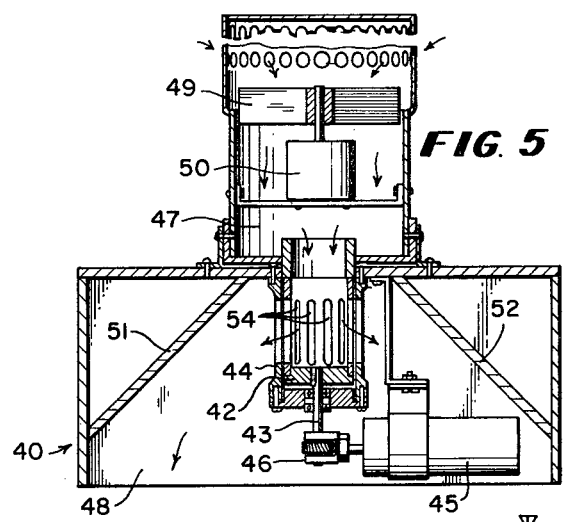
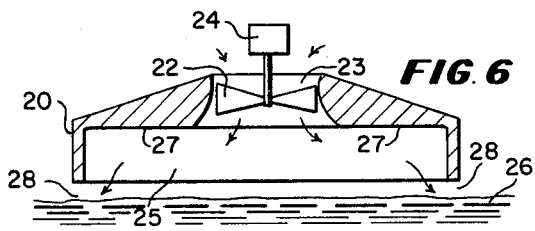
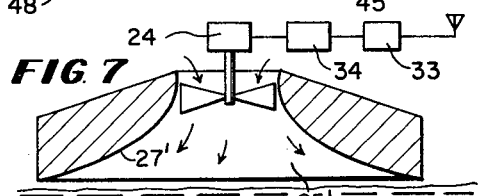
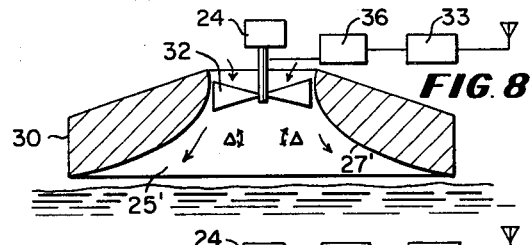
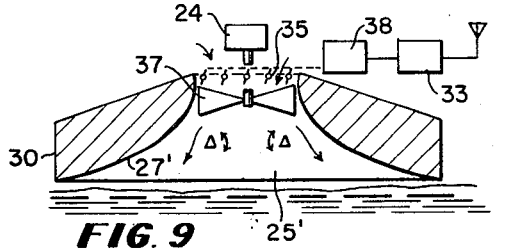
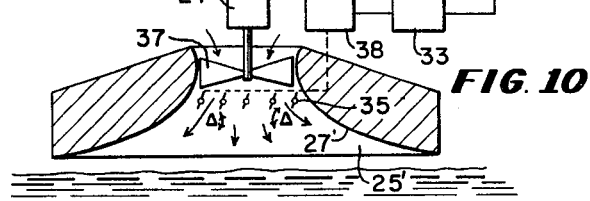
INVENTOR
ROBERT A. BRODING
BY Mason, Kolehmainen,
Rathburn & Wyss
ATTORNEYS

AIR CUSHION SEISMIC VIBRATOR

The present invention relates to acoustic transducers, and more particularly to vibrators for seismic prospecting.

No suitable device is presently available for producing seismic vibrations in areas where the ground is soft, such as over swampy terrain. Ocean going seismic vibrators are available, but they must be submerged a considerable distance beneath the surface of the water before they can produce vibrations of suitable strength and therefore cannot be used where the water is shallow. Seismic vibrators for use on dry land are generally attached to heavy vehicles which must be jacked up onto the vibrators so as to properly load the vibrators. Such truck mounted vibrators cannot be used in terrain that is inaccessible by ordinary roads or in areas where the ground is too soft to support a heavy vehicle.

The primary object of the present invention is to provide a seismic vibrator which can operate equally well over water, swamp land, and solid land, and that can be easily and freely moved about in underdeveloped areas where there are no roads of any kind.

In brief, the present invention comprises an air cushion vehicle or ground effect machine that includes an air flow modulator placed in the air flow path. This modulator regulates the air flow in such a manner that a pressure modulated air flow is achieved. The inside of the vehicle is preferably shaped to focus these modulations towards the surface of the earth beneath the vehicle. In this manner a modulated pressure wave is applied to the earth and is distributed over a relatively large area. Vehicles of this type can be heavily loaded and hence can apply a tremendous amount of energy to the earth's surface with only a few pounds of a lift pressure. The vehicle is preferably designed to be easily driven about and moved from location to location.

Further objects and advantages of the present invention will become apparent in the detailed description which follows. The points of novelty which characterize the present invention will be pointed out with particularity in the claims annexed to and forming a part of this specification.

For better understanding of the present invention, reference will be made to the drawings wherein:

FIG. 3 is an elevational, partly sectional view of an air cushion vehicle including two or more of the seismic vibrators shown in FIG. 1 and also including a propulsion mechanism and a control panel;

FIG. 4 is a prospective view of an air cushion seismic vibrator with a corner cut out to reveal the mechanism;

FIG. 5 is an elevational sectional view of the vibrator shown in FIG. 4 with the section taken along the line 5 — 5 in FIG. 4;

FIG. 6 is an elevational sectional view of a conventional air cushion device;

FIG. 7 is an elevational sectional view of an air cushion device wherein the speed of the impeller is varied to modulate the air flow;

FIG. 8 is an elevational sectional view of an air cushion device wherein the pitch of the air impeller is varied to modulate the air flow;

FIG. 9 is an elevational sectional view of an air cushion device wherein air flow modulation vanes preceding the impeller are used to modulate the air flow; and FIG. 10 is an elevational sectional view of an air cushion device wherein air flow modulation vanes following the air impeller are used to modulate the air flow.

Figure 1:
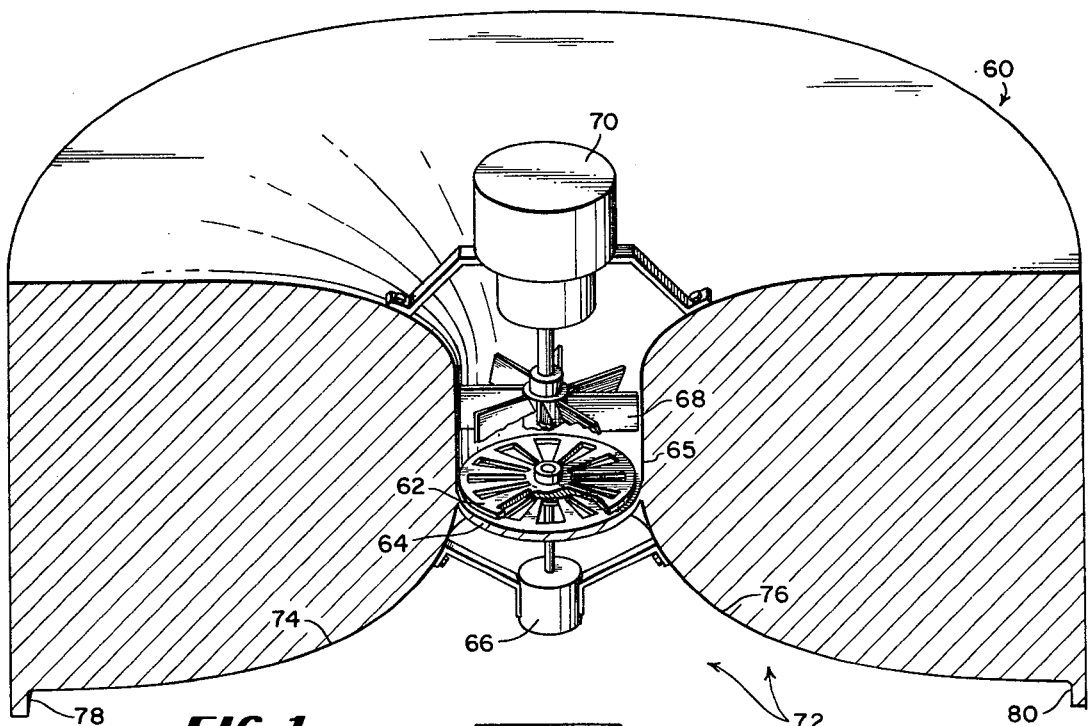
FIG. 1 is a partly sectional perspective view of an air cushion seismic vibrator designed in accordance with the present invention.

Referring now to the drawings, FIG. 6 shows a conventional air cushion or ground effect vehicle 20 in section. The vehicle 20 includes an impeller 22 positioned within a channel 23 and driven by a suitable source of power 24. The impeller 22 drives air into a plenum chamber 25. The plenum chamber 25 is closed at one end by its close proximity to the surface of the earth 26. As the impeller 22 rotates, pressure is developed within the plenum chamber 25. This pressure is increased until the force which the pressure within the chamber 25 exerts against the area of the upper surface 27 of the chamber 25 is greater than the downward force caused by the weight of the vehicle 20. In most cases it takes only a very small pressure to lift the vehicle 20. For example, if the plenum chamber 25 is about 10 feet in diameter and if the impeller 22 creates a pressure within the chamber 25 that is 1 pound per square inch greater than the outside pressure, a vehicle weighing approximately 5½ tons can be lifted from the ground. As the vehicle rises, air gaps 28 develop between the edges of the chamber 25 and the ground 26. These air gaps allow air within the plenum chamber 25 to escape and thus reduce the pressure within the plenum chamber 25. Curtains or other suitable closure devices (not shown) can be provided to minimize this leakage of air. The impeller 22 must supply to the plenum chamber 25 sufficient air to compensate for the air which leaks out through the air gaps 28.

The present invention contemplates providing some form of modulation in the air flow path so that pressure waves are directed against the surface of the earth and so that an acoustic vibration is applied to the earth's surface. FIGS. 7, 8, 9, and 10 show four different ways in which this can be done. FIG. 7 shows an air cushion device having an impeller source of power 24 which is varied in speed at an acoustic rate. Radio signals containing modulation information are received by a radio receiver 33 and are transferred to a power controller 34. The power controller 34 then supplies modulated power to the power source 24. The power source 24 can be a synchronous A. C. motor and the power controller 34 can be a D.C. to A.C. convertor whose frequency output varies with the modulation signal. A low inertia impeller 22 is required if this system is to operate properly. If the source of power 24 is a gasoline engine and if the impeller 22 has a large angular inertia, this system of modulation cannot be used except for very low frequency surveying.

FIG. 8 shows an air cushion vehicle 30 having a variable pitch impeller 32. Radio signals containing the modulation information are received by a radio receiver 33 and are transferred to a regulation mechanism 36 which varies the pitch of the impeller 32 blades. In this manner, the pitch of the impeller 32 is altered in accordance with the received modulation signal.

FIGS. 9 and 10 show similar arrangements wherein shutters 35 are used to modulate the air flowing past an impeller 37. A shutter control 38 drives the shutters 35 in accordance with signals received from the radio receiver 33. In FIG. 10, the shutters 35 are located on the output side of the impeller 37. In FIG. 9, the shutters 35 are located on the input side of the impeller 37.

The upper surface 27' of the plenum chamber 25' is given a roughly exponential taper in FIGS. 7, 8, 9, and 10 so that the plenum chamber 25' is shaped like the bell of a trumpet or trombone. The purpose of this taper is to uniformly distribute the acoustic wave over the surface of the earth. A conventional plenum chamber such as the chamber 25 shown in FIG. 6 can be of almost any shape. When an air cushion vehicle is used for seismic surveying, the chamber preferably is tapered uniformly from the modulator to the surface of the earth. The taper minimizes reflections and impedance mismatches within the plenum chamber and insures that all acoustic energy is applied to the surface of the earth. The taper also distributes the acoustic wave uniformly over a large area, and thereby increases the coupling between the modulator and the earth. Since a severe impedance mismatch exists between the earth and the air within the plenum chamber, it is important to maximize the area over which the acoustic wave is applied.

FIGS. 4 and 5 show a very simple ground effect machine which illustrates the basic principles of the present invention. A simple shutter modulator is constructed from two concentric cylinders 42 and 44 having a number of vertical slits 54 cut into their respective cylindrical surfaces. The inner cylinder 42 is rotated by a shaft 43 which in turn is rotated by an electric motor 45. A right angle drive 46 couples the shaft 43 to the electric motor 45. An outer cylinder 44 remains stationary. When the vertical slits 54 in the inner cylinder 42 are aligned with the slits 54 in the outer cylinder 44, air flows freely from an upper reservoir 47 into a plenum chamber 48. When the cylinders 42 and 44 are so aligned that the vertical slits 54 are adjacent solid portions of the cylinders 42 and 44, the flow of air from the reservoir 47 into the plenum chamber 48 is blocked. An impeller 49 driven by a motor 50 normally drives air through the cylinders 42 and 44 into the plenum chamber 48. A modulation signal is applied to the motor 45. The result of this arrangement is that a modulated wave-front passes into the plenum chamber 48 and down into the earth below the plenum chamber 48. Deflectors 51 and 52 reflect these sound waves down towards the surface of the earth and thereby increase the efficiency of the apparatus 40. The deflectors 51 and 52 are a first approximation to an exponential coupling between the modulated air source and the earth.

Figure 2:
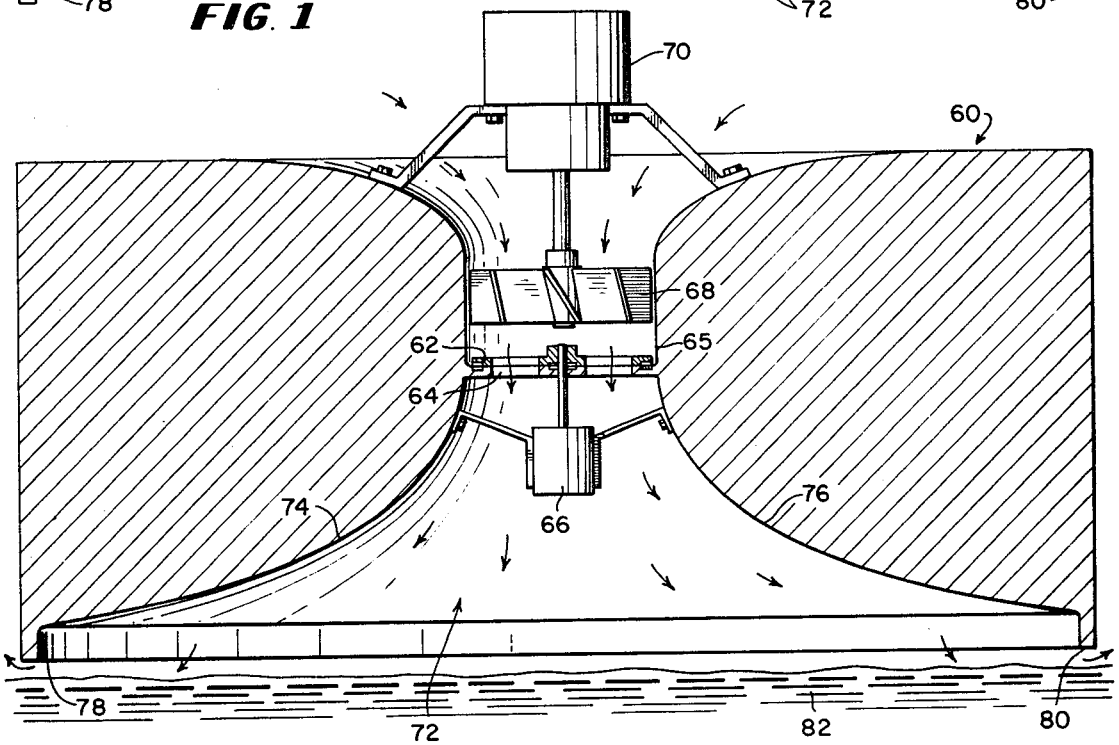
FIG. 2 is an elevational, partly sectional view of the vibrator shown in FIG. 1 hovering above the surface of the earth.

FIGS. 1 and 2 show a more sophisticated version of the present invention in the form of an air cushion vibrator 60. Modulation is provided by a siren constructed from two adjacent slotted plates 62 and 64. The lower plate 64 is stationary and is affixed to the edges of an air channel 65. The upper plate 62 rests directly against the lower plate 64 and is rotated by a modulating motor 66. Suitable thrust or roller bearings can be provided between the plates 62 and 64. An impeller 68 driven by a rotary power source 70 is located directly above the two plates 62 and 64. When the plates 62 and 64 are aligned so as to close off the air passage, the impeller 68 creates a relatively high pressure above the plates 62 and 64. When the plates 62 and 64 rotate so that their slots are adjacent one another thereby opening the air passage, the pressure is released and is allowed to flow into a tapered plenum chamber 72. The side walls 74 and 76 of the plenum chamber 72 are tapered essentially exponentially away from the lower modulator plate 64 out to the edges 78 and 80 of the vehicle 60 so as to provide the best possible acoustic coupling between the air flowing from the modulator plates 62 and 64 and the surface of the earth 82 (FIG. 2).

FIG. 3 shows a ground effect vehicle 92 which includes two or more of the air cushion vibrators 60 shown in FIG. 2. A single engine 84 provides rotary power for the vibrators 60 and also for a directional propulsion propeller 86 located at the front or rear of the vehicle 92. A seat 88 and a control panel 90 are provided at one end of the vehicle for supervisory personnel. The nature of the vehicle 92 is such that it can move over dry land, over the open ocean, and even over swampy land which conventional vehicles could not possible navigate. Preferably the vehicle is of a fairly large size and covers a wide surface area. The vehicle is preferably heavily loaded so as to provide solid backing for the acoustic waves.

The problem of coupling acoustic energy into the earth by means of an air column is a problem of acoustic impedance matching. In the field of acoustics, acoustic impedance is defined as density multiplied by propagation velocity. Air, which has an average density of 0.00129 grams/cc and a typical propagation velocity for sound of 331 meters/second, has an acoustic impedance of $Z_A = 42.86$ grams/centimeter$^2$·second. Water, which has a density of 1 gram/cc and a propagation velocity for sound of approximately 1,500 meters/second, has a characteristic impedance of approximately $Z_t = 150,000$ grams/centimeter$^2$·second. The earth, which has a typical density of around 2 grams/cc and through which sound propagates at a velocity between 1,500 and 600 meters/second, has a characteristic impedance which ranges from around $Z_E = 300,000$ to $Z_E = 1,500,000$ grams/centimeter$^2$·second. In transferring power from air within the plenum chamber of an air cushion vehicle to a body of water on the earth's surface, the transmission coefficient $\alpha_t$ is given by the equation:

$$\alpha_t = 4 \left(\frac{Z_W}{Z_A}\right)\left(\frac{Z_W}{Z_A}+1\right)^{-2}$$

If the typical values are plugged into the above equation, the transmission coefficient $\alpha_t$ is found to be around $10^{-3}$. Therefore, a poor coefficient of coupling exists between the plenum chamber and the earth below the chamber. It is necessary to take steps which maximize the transmission of energy into the earth.

A first approach to providing an improved air-to-earth coupling is to employ a resonant plenum chamber as a matching device. The chamber can be designed in such a manner that it resonates at the modulating frequency and can be shaped so that low pressure, long distance movements at the modulator are transformed into high pressure, short distance movements of air at the surface of the earth. Such an arrangement would be highly satisfactory for seismic survey work done at a single constant frequency, for example of the type used in a holographic seismic survey system. A resonant chamber probable could not be utilized for seismic survey work where a swept frequency is used, since such swept waveforms usually cover two octaves. The problems of constructing a resonant chamber that would remain resonant over a two-octave range would be difficult to overcome, if not impossible.

A modification of the resonant chamber coupling concept is that of using an exponentional horn to couple the modulator to the surface of the earth. FIG. 2 illustrates how an exponentional horn can be provided within a conventional ground effect machine. The walls 74 and 76 of the plenum chamber 72 are curved more or less exponentially so that their shape approximates the bell shape of a wind instrument. The narrow neck of the bell is adjacent the modulation plates 62 and 64, while the flaired portion of the bell is adjacent the earth 82. This arrangement greatly improves the coupling between the modulator plates 62 and 64 and the earth 82. The exponential coupling serves to insure that all the air within the chamber 72 is modulated. Nothing can be done about the impedance mismatch between the air within the chamber 72 and the earth 82, so the proper approach is to make the chamber opening adjacent the surface of the earth as large as is practicable. This maximizes transmission to the earth by maximizing the area over which the modulated acoustic wave is spread.

The exponential plenum chamber may be considered a wide-band transformer which couples the modulator to the air above the earth. The horn throat impedance (at the modulator) is equal to the acoustic impedance of the air divided by the throat area $S_T$ and further divided by the ratio of the frequency being transmitted to the speed of sound in air. The horn cut-off frequency is equal to a flair constant $m$ multiplied by the speed of sound and divided by $4\pi$. The flair constant $m$ is defined by the following equation:

$$S_E = S_T \exp(mx)$$

where $S_E$ = area at surface of earth
$S_T$ = throat area adjacent modulator
$x$ = height of the plenum chamber.

The approach is one of making the mouth opening of the plenum chamber as large as possible while still retaining a good impedance match between the modulator and the horn. The impedance output of the modulator will vary depending upon the design of the modulator and is best determined experimentally.

To a first approximation, the modulator impedance is equal to the change in pressure caused by a unit change in the total flow. Total flow is defined as the product of the modulator throat area multiplied by the air flow rate per unit area per unit time. The pressure across the modulator required to maintain a given absolute flow rate is equal to one-half the impedance of air multiplied by the square of the desired flow rate. Hence, the impedance of the modulator is one-half the impedance of air multiplied by the total flow and divided by the square of the modulator throat area.

Generally frequencies below the resonant frequency of the plenum chamber are used so that a wide band of frequencies can be passed. If single frequency surveying is carried out, the entire plenum chamber can be make to resonate at the desired frequency, and improved transmission of sound can thus be achieved. As with inductive peaking in an electrical circuit, the resonance of the plenum chamber can also be used to extend the range of frequencies which can be transmitted by peaking either the high end, the low end, or both ends of the frequency response characteristic of the system. When correlation signal detection techniques are used, the correlation function can be altered to compensate for irregularities in the transmission waveform due to irregularities in frequency transmission.

Since only the preferred embodiment of the present invention has been disclosed in the present application, numerous modifications and changes will occur to those skilled in the art. It is therefore intended by the appended claims to cover all such modifications and changes as come within the true spirit and scope of the present invention.

What is claimed as new and desired to be secured by Letters Patent of the United States is:

1. A seismic vibrator for generating seismic waves in the earth comprising:
   a structure forming a plenum chamber, said plenum chamber having at least one large opening adjacent the earth and having at least one small opening at another location;
   means for providing a flow of air into said plenum chamber through said smaller opening;
   means for generating a signal containing one or more frequency components falling within the range of frequencies suitable for seismic prospecting; and
   means for pressure modulating the air within said plenum chamber with said signal, said pressure modulating means being separate from said means for providing a flow of air.

2. A seismic vibrator in accordance with claim 1 wherein the means for pressure modulating comprise an air flow valve placed in the path of said air flow and arranged to alternately impede said flow and permit said flow at the desired modulating signal frequency.

3. A seismic vibrator in accordance with claim 2 wherein the air flow valve is located between the means for providing a flow of air and the plenum chamber.

4. A seismic vibrator for generating seismic waves in the earth comprising:
   a structure forming a plenum chamber, said plenum chamber having at least one large opening adjacent the earth and having at least one small opening at another location;
   means for providing a flow of air into said plenum chamber through said smaller opening;
   means for generating a signal containing one or more frequency components falling within the range of frequencies suitable for seismic prospecting; and
   means for pressure modulating the air within said plenum chamber with said signal, said means comprising a motor connected to an impeller in said air path, said motor having a variable speed drive the speed of which can be varied at the desired signal frequency rate.

5. A seismic vibrator for generating seismic waves in the earth comprising:
   a structure forming a plenum chamber, said plenum chamber having at least one large opening adjacent the earth and having at least one small opening at another location, and said plenum chamber having walls which are tapered approximately exponentially between the small openings and the large openings;

means for providing a flow of air into said plenum chamber through said smaller openings;

means for generating a signal containing one or more frequency components falling within the range of frequencies suitable for seismic prospecting; and means for pressure modulating the air within said plenum chamber with said signal, said pressure modulating means being separate from said means for providing a flow of air.

6. A seismic vibrator for use in seismic surveying comprising:

an air cushion vehicle including at least one plenum chamber having an opening adjacent the surface of the earth;

at least one channel connecting each of said chambers to the outside air;

impeller means within said channels for forcing air into said plenum chambers;

means for generating a signal containing one or more frequency components falling within the range of frequencies suitable for seismic prospecting; and means for pressure modulating the air within said plenum chamber with said signal, said pressure modulating means being separate from said impeller means.

7. A seismic vibrator in accordance with claim 6, wherein the modulation means comprises sirens within said channels whose speed of rotation is controlled to alternately impede and permit the flow of air in said channels at the desired signal frequency.

8. A seismic vibrator for use in seismic surveying comprising:

an air cushion vehicle including at least one plenum chamber having an opening adjacent the surface of the earth;

at least one channel connecting each of said chambers to the outside air, said plenum chambers having walls which are tapered exponentially from the channels to the openings adjacent the surface of the earth;

impeller means within said channels for forcing air into said plenum chambers;

means for generating a signal containing one or more frequency components falling within the range of frequencies suitable for seismic prospecting; and means for pressure modulating the air within said plenum chamber with said signal, said pressure modulating means being separate from said means for providing a flow of air.

9. A seismic vibrator in accordance with claim 6 wherein the modulation means comprise air flow valves in said channels arranged to open and close at the desired signal frequency.

10. A seismic vibrator for use in seismic surveying comprising:

an air cushion vehicle including at least one plenum chamber having an opening adjacent the surface of the earth;

at least one channel connecting each of said chambers to the outside air;

impeller means within said channels for forcing air into said plenum chambers;

means for generating a signal containing one or more frequency components falling within the range of frequencies suitable for seismic prospecting; and means for pressure modulating the air within said plenum chamber with said signal, said pressure modulating means comprising variable speed drives for said impeller means the speed of which can be varied at the desired signal frequency.

11. An air cushion seismic vibrator comprising:

a structure forming a plenum chamber having a first large opening and a second smaller opening, and having walls shaped to couple said first and second openings in a roughly exponential manner;

an air channel connected to said second smaller opening;

an air impeller within said air channel forcing air into said structure;

an air flow valve positioned in the air flow path between said air impeller and said first large opening pressure modulating the flow of air to impress a seismic signal onto the air within the plenum chamber, said seismic signal containing one or more frequency components falling within the range of frequencies suitable for seismic prospecting.

12. An air cushion seismic vibrator in accordance with claim 11 wherein the air flow valve comprises:

a pair of perforated surfaces positioned adjacent one another, each of said surfaces extending to the edges of the air flow space so that air flows through the perforations; and means for relatively rotating the surfaces with respect to each other.

13. An air cushion seismic vibrator in accordance with claim 12 wherein each of the perforated surfaces is cylindrical and wherein the perforated surfaces are mounted coaxially.

14. An air cushion seismic vibrator in accordance with claim 12 wherein each of the perforated surfaces is a circular disk, said disks being positioned adjacent one another so as to block said air channel.

* * * * *